United States Patent
Tseng et al.

(10) Patent No.: US 10,113,593 B1
(45) Date of Patent: Oct. 30, 2018

(54) ENCODER WITH OIL GAS PREVENTION STRUCTURE

(71) Applicant: HIWIN MIKROSYSTEM CORP., Taichung (TW)

(72) Inventors: Wei-Kai Tseng, Taichung (TW); Jheng-Ying Lin, Taichung (TW); Yi-Shun Huang, Taichung (TW); Hsin-Wei Tsai, Taichung (TW)

(73) Assignee: HIWIN MIKROSYSTEM CORP., Taichung City (TW)

( * ) Notice: Subject to any disclaimer, the term of this patent is extended or adjusted under 35 U.S.C. 154(b) by 0 days.

(21) Appl. No.: 15/669,903

(22) Filed: Aug. 5, 2017

(51) Int. Cl.
| F16C 41/00 | (2006.01) |
| F16C 19/54 | (2006.01) |
| G01D 5/347 | (2006.01) |

(52) U.S. Cl.
CPC ............ *F16C 41/007* (2013.01); *F16C 19/54* (2013.01); *G01D 5/34707* (2013.01)

(58) Field of Classification Search
CPC .......................... F16C 41/007; G01D 5/34707
See application file for complete search history.

(56) References Cited

U.S. PATENT DOCUMENTS

| 6,672,681 | B1* | 1/2004 | Moretti | B61F 15/20 |
| | | | | 301/109 |
| 7,982,455 | B2* | 7/2011 | Ito | G01P 3/443 |
| | | | | 324/174 |
| 9,243,976 | B2* | 1/2016 | Klinglmair | G01M 13/04 |
| 2013/0278118 | A1* | 10/2013 | Maze | F16C 41/007 |
| | | | | 310/68 B |

* cited by examiner

*Primary Examiner* — Thomas R Hannon
(74) *Attorney, Agent, or Firm* — Guice Patents PLLC

(57) ABSTRACT

An encoder with oil gas prevention structure including a base, a shaft, a bearing, a cover and an encoding device is provided. The base includes a body and a through hole configured on the body. The shaft is disposed within the though hole. The bearing holds the shaft and is disposed within the through hole, and includes an inner ring and an outer ring wherein the inner ring is set against the first section, and the outer ring is set against a circumference of the through hole. The cover holds the shaft and adjacent to the bearing. The encoding device holds the shaft and is disposed on the cover, and includes a code disc rotatably disposed on the shaft wherein the cover is located between the bearing and the code disc. Therefore, the code disc is prevented from being contaminated by the leaking oil gas from the bearing.

6 Claims, 4 Drawing Sheets

ENCODER WITH OIL GAS PREVENTION STRUCTURE

BACKGROUND OF THE INVENTION

Field of the Invention

The invention relates to an encoder, and more particularly to an encoder with oil gas prevention structure.

Description of the Related Art

Encoders are widely used in many applications that require precise shaft rotation—including industrial controls, robotics, and automation equipment. The information, such as angular position, rotational speed, and direction are provided to control the phase, speed, and position of the motor.

The encoder is disposed with the shaft or the sleeve of the motor, wherein the code disc is rotated synchronously with the motor. In order to keep the smooth rotation, the oil lubrication is necessarily applied to the bearing.

However, the oil gas resulted from the high temperature during the rotation is diffused to contaminate the grating of the code disc such that the sensing accuracy is decreased.

SUMMARY OF THE INVENTION

In view of the disadvantages of prior art, the object of the present invention is to provide an encoder with oil gas prevention structure to prevent the code disc of the encoder from being contaminated by the leaking oil gas.

To achieve the above object, the present invention provides an encoder with oil gas prevention structure including a base, a shaft, a bearing, a cover and an encoding device. The base includes a body and a through hole configured on the body. The shaft includes a first section, a second section, and a shoulder wherein the shoulder is configured between the first section and the second section, and corresponding to the first section. The bearing holds the shaft and is disposed within the through hole. The bearing includes an inner ring and an outer ring wherein the inner ring is set against the first section, and the outer ring is set against a circumference of the through hole. The cover holds the shaft and adjacent to the bearing. The cover includes a sheet with an inner portion and an outer portion wherein the inner portion is positioned between the shoulder and the inner of the bearing, and the outer portion is adjacent to the outer ring to contain the bearing. The encoding device holds the shaft and is disposed on the cover. The encoding device includes a code disc rotatably disposed on the shaft wherein the cover is located between the bearing and the code disc.

In one embodiment of the present invention, the through hole includes a first segment, a second segment and an intersegment between the first segment and the second segment. The first segment includes a first diameter and the second segment includes a second diameter larger than the first diameter. The bearing is received within the first segment, and the sheet is received within the second segment wherein the sheet includes a diameter between the first diameter and the second diameter.

In one embodiment of the present invention, the cover includes a circular groove and a plurality of indentations wherein the circular groove is configured on one side of the sheet, and the indentations are configured on the sheet and corresponding to the bearing. The circular groove includes an inner wall and an outer wall wherein the diameter of the inner wall is larger than the diameter of the inner ring, and the diameter of the outer wall is larger than the diameter of the outer ring.

In one embodiment of the present invention, the encoding device includes a sensing unit located on the shaft and between the cover and the code disc.

Accordingly, the encoder with oil gas prevention structure includes the cover to increase the containing space and the path for the leaking oil gas such that the code disc is prevented from being contaminated by the leaking oil gas by the structure of the cover.

DETAILED DESCRIPTION OF THE PREFERRED EMBODIMENTS

Figure 1:
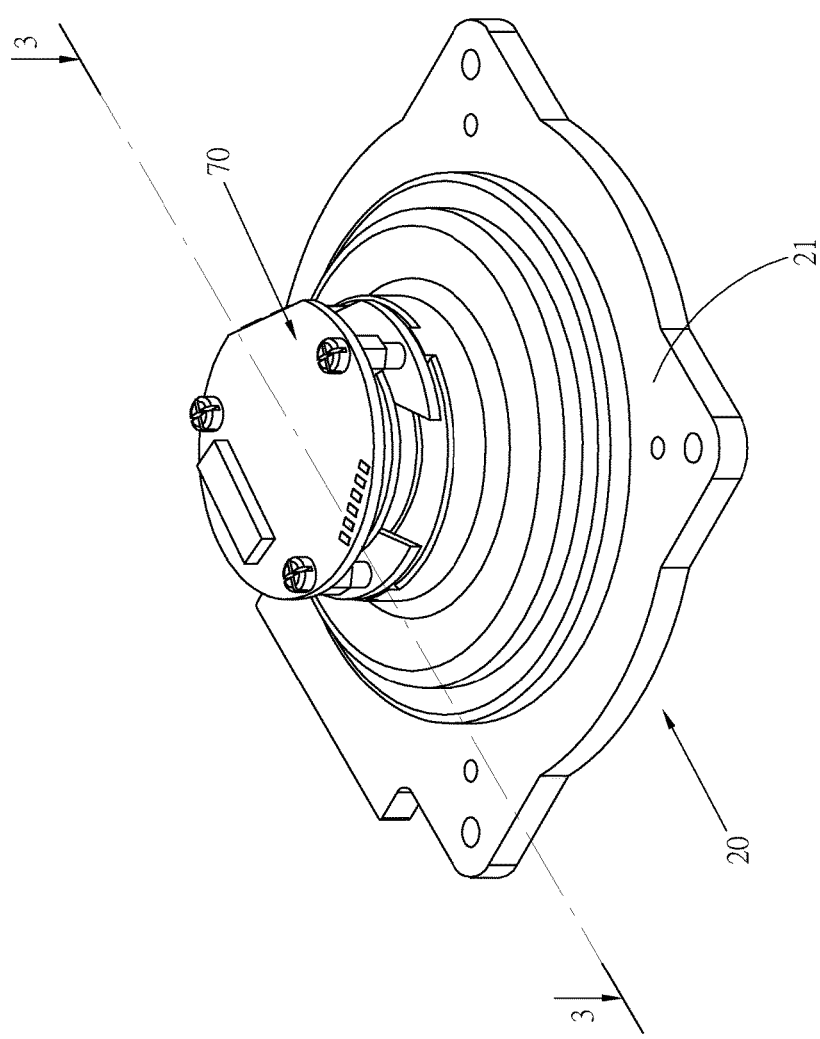
FIG. 1 is a schematic view of the embodiment of the present invention.
Figure 2:
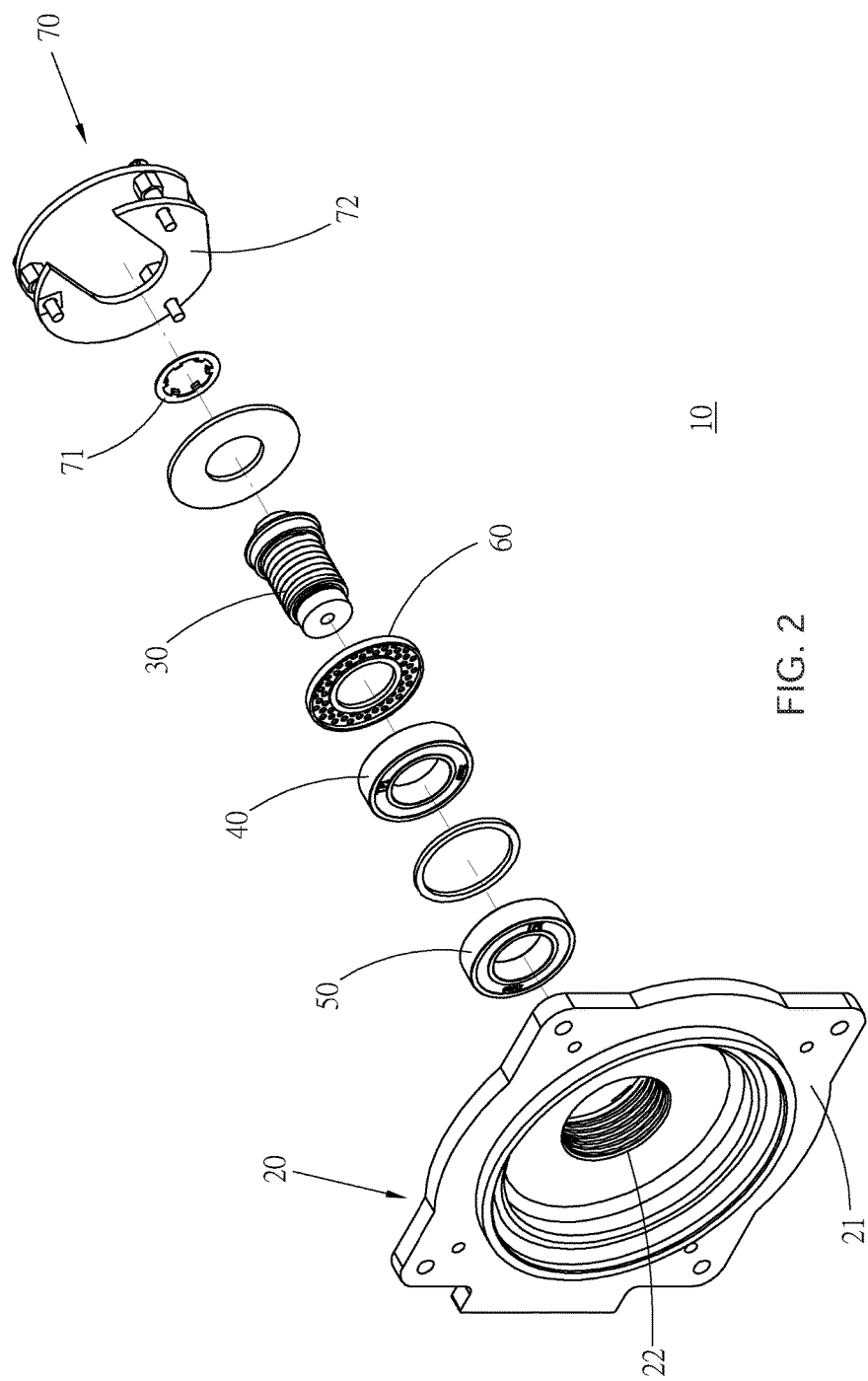
FIG. 2 is an exploded view of the embodiment of the present invention.

Refer to FIG. 1 and FIG. 2 wherein FIG. 1 illustrates a schematic view of the embodiment of the present invention, and FIG. 2 illustrates an exploded view of the embodiment of the present invention. The encoder 10 with oil gas prevention structure includes a base 20, a shaft 30, two bearings 40/50, a cover 60 and an encoding device 70. The bearings 40/50, the cover 60 and the encoding device 70 hold the shaft 30 wherein the shaft 30 is located on the base 20.

Figure 3:
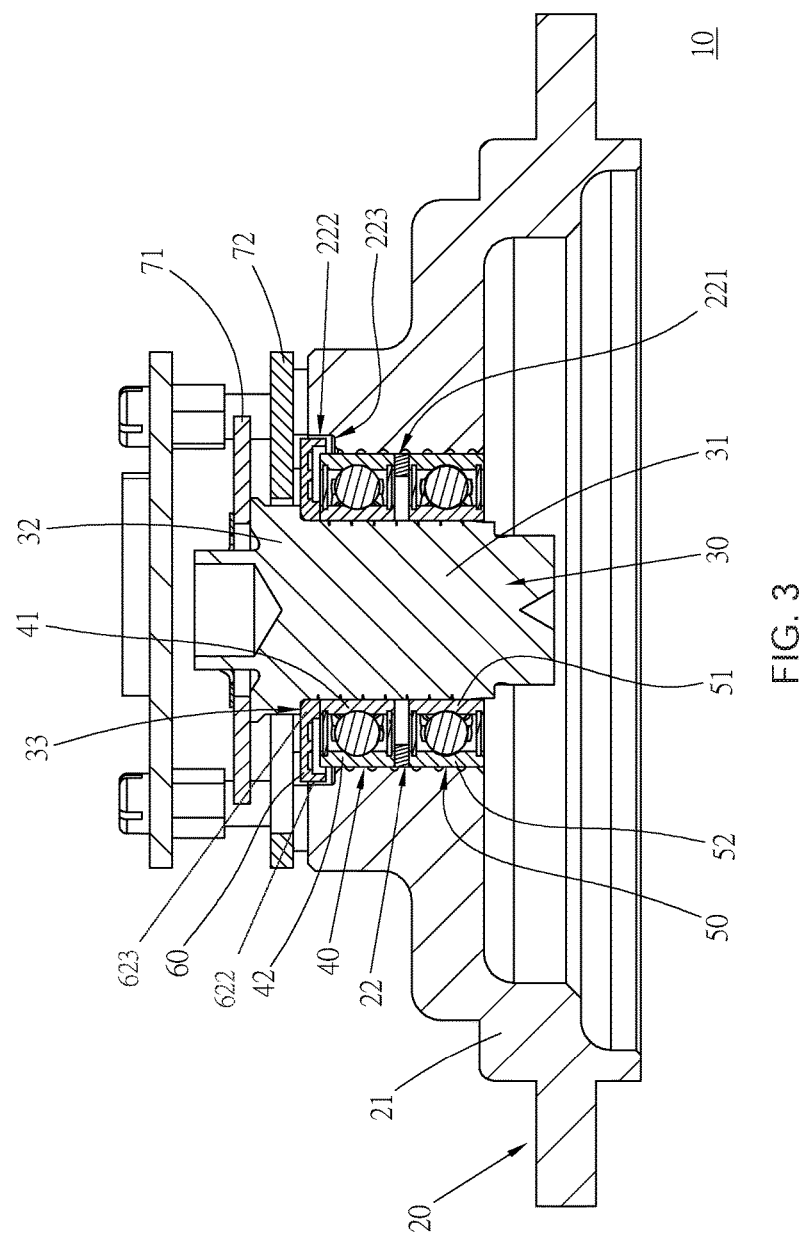
FIG. 3 is a cross sectional view of the embodiment of FIG. 1 along a section line 3-3.

Refer to FIG. 3 which illustrates a cross sectional view of the embodiment of FIG. 1 along a section line 3-3. The base 20 includes a body 21 and a through hole 22 configured on the body 21. In this embodiment, the body 21 is provided for connection with the motor through the fastening means, such as screw. The through hole 22 includes a first segment 221, a second segment 222 and an intersegment 223 between the first segment 221 and the second segment 222. The first segment 221 includes a first diameter and the second segment 222 comprises a second diameter larger than the first diameter.

The shaft 30 is disposed within the though hole 22 of the base 20, and includes a first section 31, a second section 32, and a shoulder 33 wherein the diameter of the first section 31 is less than the diameter of the second section 32 to define the shoulder 33 configured therebetween. The first section 31 is received within the first segment 221 and the second segment 222, and the second section 32 is protruded from the through hole 22.

The bearings 40/50 hold the shaft 30 and are disposed within the through hole 22. Each of the bearings 40/50 includes an inner ring 41/51 and an outer ring 42/52 wherein the inner ring 41/51 is set against the first section 31 of the shaft 30, and the outer ring 42/52 is set against a circumference of the first segment 221 of the through hole 22. Therefore, the shaft 30 is rotated due to the supporting from bearings 40/50 located between the shaft 30 and the base 20.

Figure 4:
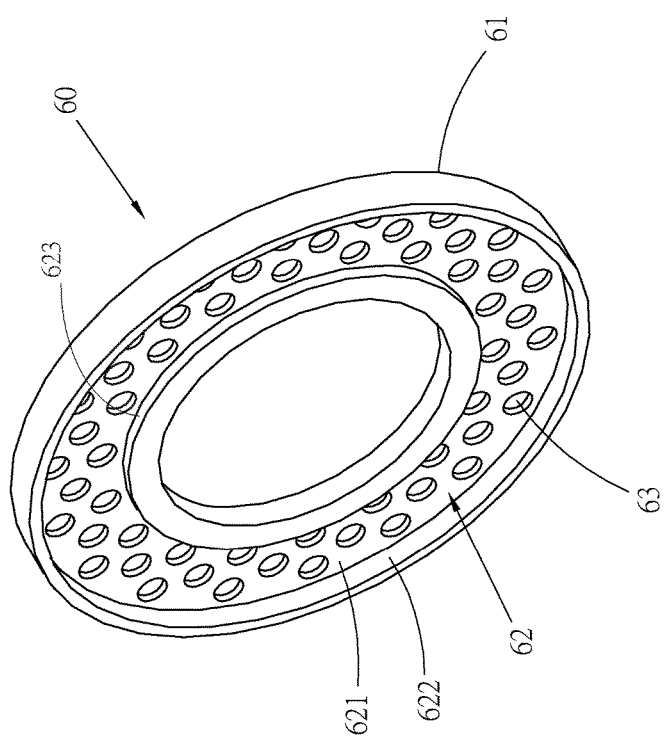
FIG. 4 is a schematic view of the cover of the embodiment.

Refer to FIG. 2 to FIG. 4 wherein FIG. 4 illustrates a schematic view of the cover of the embodiment. The cover 60 holds the shaft 30, and includes a sheet 61, a circular groove 62 and a plurality of indentations 63. The sheet 61 includes an inner portion positioned between the shoulder 33 and the inner ring 41 of the bearing 40, and is rotated with the shaft 30 synchronously. Moreover, the sheet 61 includes an outer portion adjacent to the outer ring 42 of the bearing 40, and containing the bearing 40. The circular groove 62 is configured on one side of the sheet 61 and corresponds to the bearing 40. In addition, the circular groove 62 includes an inner wall 623 and an outer wall 622 wherein the diameter of the inner wall 623 is larger than the diameter of the inner ring 41, and the diameter of the outer wall 622 is larger than the diameter of the outer ring 42. The indentations 63 are configured on a bottom 621 of the circular groove 62.

Refer to FIG. 2 and FIG. 3. The encoding device 70 includes a code disc 71, a sensing unit 72, and a light emitting unit (not shown) wherein the code disc 71 is located between the sensing unit 72 and the light emitting unit, and the sensing unit 72 senses the light from the light emitting unit. The code disc 71 is rotatably disposed on the shaft 30, and the cover 60 is located between the bearings 40/50 and the code disc 71. The sensing unit 72 is located on the shaft 30 and between the cover 60 and the code disc 71.

By clipping the inner portion of the sheet 61 between the shoulder 33 and the inner ring 41, the cover 60 is fixed without additional fastening element to facilitate the fabrication and decrease the material cost.

Also, the cover 60 is provided to prevent the code disc 71 from contamination resulted from the leaking oil gas of the bearings 40/50 during the operation. Moreover, the containing space for the leaking oil gas is increased due to the indentations 63 configured on the bottom 621 and the circular groove 62, and the path for the leaking oil gas is extended due to the outer wall 622 within the second segment 222. Therefore, the code disc 71 is prevented from being contaminated by the leaking oil gas by the structure of the cover 60.

Specifically, the shape of the indentation 63 includes but not limited in the circle described above, and can be other shape, such as polygon or geometry. Besides, the indentations 63 can be configured on the side wall of the circular groove 62. In other embodiment, the cover 60 is provided with oil absorbent capability by installing the oil absorbent cotton or manufacturing with powder metallurgy process to create porous structure.

Consequently, the encoder with oil gas prevention structure of the present invention includes the following advantages:

First, the cover 60 is fixed between the bearings 40/50 and the encoding device 70 through structure arrangement to facilitate the fabrication and decrease the material cost. Second, the cover 60 includes the circular groove 62 and the indentations 63 to extend the path and the containing space for the leaking oil gas such that the code disc 71 is prevented from being contaminated by the leaking oil gas, particles or vapor.

What is claimed is:

1. An encoder with oil gas prevention structure, comprising:
    a base, comprising a body and a through hole configured on the body;
    a shaft, disposed within the though hole, and comprising a first section, a second section, and a shoulder wherein the shoulder is configured between the first section and the second section, and corresponding to the first section;
    a bearing, holding the shaft and disposed within the through hole, and comprising an inner ring and an outer ring wherein the inner ring is set against the first section, and the outer ring is set against a circumference of the through hole;
    a cover, holding the shaft and adjacent to the bearing, and comprising a sheet, a circular groove and a plurality of indentations wherein the circular groove is configured on one side of the sheet, and the circular groove is configured on the sheet and corresponds with the bearing; and
    an encoding device, holding the shaft and the shaft is inserted through the cover, and comprising a code disc rotatably disposed on the shaft wherein the cover is located between the bearing and the code disc.

2. The encoder with oil gas prevention structure as claimed in claim 1, wherein the through hole comprises a first segment, a second segment and an intersegment between the first segment and the second segment; the first segment comprises a first diameter and the second segment comprises a second diameter larger than the first diameter; the bearing is received within the first segment, and the sheet is received within the second segment wherein the sheet comprises a diameter between the first diameter and the second diameter.

3. The encoder with oil gas prevention structure as claimed in claim 2, wherein the circular groove comprises an inner wall and an outer wall; a diameter of the inner wall is larger than a diameter of the inner ring, and a diameter of the outer wall is larger than a diameter of the outer ring.

4. The encoder with oil gas prevention structure as claimed in claim 1, wherein the indentations are configured on a bottom of the circular groove.

5. The encoder with oil gas prevention structure as claimed in claim 1, wherein the sheet is in the form of circle and coaxial with the circular groove.

6. The encoder with oil gas prevention structure as claimed in claim 1, wherein the encoding device comprises a sensing unit located on the shaft and between the cover and the code disc.

* * * * *